United States Patent [19]
Schubert

[11] Patent Number: 5,961,759
[45] Date of Patent: Oct. 5, 1999

[54] METHOD AND APPARATUS FOR APPLYING A PLASTIC SPACER ONTO A GLASS PANEL

[75] Inventor: Heinz Schubert, Pforzheim, Germany

[73] Assignee: Lenhardt Maschinenbau, GmbH, Neuhausen-Hamberg, Germany

[21] Appl. No.: 08/817,027

[22] PCT Filed: Sep. 19, 1995

[86] PCT No.: PCT/EP95/03684

§ 371 Date: Mar. 21, 1997

§ 102(e) Date: Mar. 21, 1997

[87] PCT Pub. No.: WO96/09456

PCT Pub. Date: Mar. 28, 1996

[30] Foreign Application Priority Data

Sep. 22, 1994 [DE] Germany .............................. 44 33 749

[51] Int. Cl.⁶ .................................................. B32B 21/00
[52] U.S. Cl. ..................................... 156/109; 156/244.11
[58] Field of Search ................................ 156/107, 109, 156/244.11, 108

[56] References Cited

U.S. PATENT DOCUMENTS

| | | | |
|---|---|---|---|
| 3,759,771 | 9/1973 | Battersby | 156/109 |
| 3,957,406 | 5/1976 | Battersby | 425/87 |
| 4,120,999 | 10/1978 | Chenel | 428/34 |
| 4,234,372 | 11/1980 | Bernhard et al. | 156/109 X |
| 5,350,600 | 9/1994 | Kubota | 427/256 |

FOREIGN PATENT DOCUMENTS

| | | |
|---|---|---|
| 3935994 | 5/1991 | Germany . |
| 4231424 | 3/1994 | Germany . |
| 564759 | 3/1993 | Japan . |

*Primary Examiner*—Francis J. Lorin
*Attorney, Agent, or Firm*—Dvorak & Orum

[57] ABSTRACT

A method and apparatus for applying a plastic strand (35), as a spacer with a predefined intended thickness (D), onto a glass panel (33) in order to constitute insulating glass panes, by means of a nozzle (17) which is moved along the edge of the glass panel (33) around the latter and thereby deposits the strand (35) emerging from the nozzle (17) onto the glass panel (33) so that the beginning and end of the strand (35) abut one another. The thickness of the strand (35) upon emergence from the nozzle (17) is increased, at the beginning of a segment with a defined length (L), from zero to the intended thickness (D); and in complementary fashion thereto, at the end of the strand (35) is decreased over the same length from the intended thickness (D) to zero.

9 Claims, 4 Drawing Sheets

METHOD AND APPARATUS FOR APPLYING A PLASTIC SPACER ONTO A GLASS PANEL

BACKGROUND OF THE INVENTION

It is known in the assembly of insulating glass panes whose glass panels are held apart and adhered to one another by a plastic spacer, first to apply the strand-like spacer onto a first of the two glass panels along its edge, such that a gap remains between the ends of the spacer in the vicinity of a corner of the glass panel, and is not closed until later, after assembly and pressing of the insulating glass pane. Closing must be performed very carefully so as not to leave open any gap through which moisture might penetrate into the interior of the insulating glass pane. It is known to close the gap by passing a heated shaped element around that end of the plastic spacer at which the gap is located, so that the thermoplastic material of which the spacer is made softens, and the two ends of the strand of which it is constituted join one another to form a continuous frame. This entails problems in practical implementation, however: the abutting surfaces between the two ends of the spacer cannot be reached with the heated shaped element, and it is also difficult to exert pressure thereon because it is possible to act on the spacer only from outside, i.e. parallel to the abutting surfaces. It becomes particularly difficult to close the gap when it is not already quite narrow, since then the action of a heated shaped element alone is not sufficient, and instead additional thermoplastic material must be introduced into the gap, which is difficult and moreover leads to a disturbingly obvious and unattractive join between the two ends of the spacer. In this case the join also remains a weak point in the otherwise reliable seal of the interior of the insulating glass pane.

It is known to close the gap in a plastic spacer, located in the vicinity of a corner, even before the insulating glass pane is assembled, by acting on the corner from both the inside and the two outer sides with three separately movable shaped elements. This yields a better join between the two ends of the spacer, but with considerable complexity in terms of equipment and above all time, which leads to a lengthening of the cycle time of the apparatus which applies the spacer onto the glass panel.

In the case of both procedures known from the related art, it is disadvantageous that the gap initially existing between the ends of the spacer is not reproducible, since irregularly shaped abutting surfaces with varying spacing are formed.

SUMMARY OF THE INVENTION

It is the object of the present invention to indicate a way in which, in the application of an in-situ extruded strand to form a plastic spacer, the beginning and end of the strand can be joined to one another more easily, more rapidly, and more reliably.

According to the invention, the plastic strand provided as the spacer is extruded by means of a nozzle, and applied onto the glass panel, in such a way that the beginning and end of the strand meet one another not in blunt fashion, but rather by way of an oblique surface which is formed by the fact that the thickness of the strand upon emergence from the nozzle is increased, at the beginning of a segment with a defined length, from zero to the intended thickness of the strand; and in complementary fashion thereto, at the end of the strand is decreased over the same length from the intended thickness to zero, which can be achieved by means of a nozzle whose outlet cross section is modifiable and which, while it is being moved along on a glass panel, can be lifted away from it.

Even with this procedure, a gap unavoidably results between the beginning and end of the strand, but this gap is placed under pressure when the insulating glass pane is assembled, since it is absolutely necessary and usual to press insulating glass panes, on the one hand in order to achieve the desired intended thickness of the insulating glass pane, and on the other hand to guarantee a permanent join, sealed against water vapor diffusion, between the sides of the plastic spacer and the adjacent glass panels. This pressing necessarily also presses together the two oblique surfaces at the beginning and end of the strand, and joins them sealedly together without further action. In contrast to the related art it is not necessary to act subsequently on the join with any kind of mechanical, heated devices; the equipment-related outlay associated therewith is completely eliminated, and closing of the spacer requires no additional processing time, i.e. has no influence on the cycle time of an insulating glass production line. The economic advantage of the invention is therefore considerable.

The desired sealed pressing of the two oblique abutting surfaces is promoted if the upper side of the extruded strand is configured with a slight convexity and/or if, at the abutting point between beginning and end of the strand, the end section located on the oblique beginning section slightly exceeds the intended thickness of the strand on its upper side, so that pressing of the spacer in the region of the abutting point automatically acts somewhat more strongly than in the remaining area of the spacer. The segment over which the abutting point extends is advantageously between 3 and 12 cm long; in initial experiments, a length of 8 to 10 cm has proven particularly suitable.

The apparatus according to the invention has a nozzle having a substantially rectangular outlet cross section which determines the cross-sectional shape of the emerging strand, and a slide valve which can close off the outlet opening of the nozzle and for that purpose is equipped with a first drive system which can impart to the slide valve a defined, reproducible displacement motion. A second drive system is provided to move the nozzle in a plane, specifically parallel to the flat glass panel; this can be a conventional X-Y drive system which can move the nozzle in two mutually perpendicular directions, in combination with a rotary drive system which makes it possible to reorient the nozzle at the corners through 90 degrees or, in the case of so-called molded panes, to follow the curved edge of a glass panel. It would also be possible, however, to provide instead of the X-Y drive system, a drive system that allows displacement of the nozzle in only one direction, if, in combination therewith, the glass panel is displaceable in its plane perpendicular to the displacement direction of the nozzle. Lastly, a third drive system is also provided to move the nozzle transverse to the plane of the glass panel in order to be able to lift the nozzle in controlled fashion when the end section of the strand, which is deposited on the wedge-shaped beginning section of the strand, is extruded. In order to diminish the strand cross section during removal of the nozzle from the glass panel, corresponding to the increasing distance, the drive system for actuation of the slide valve and the drive system for removal of the nozzle from the glass panel are synchronized with one another. Synchronization can be accomplished by driving a mechanical branching drive train using a shared motor. Electronic synchronization of two separate motors is, however, more elegant.

The outlet opening of the nozzle could be directed obliquely against the glass panel surface. It is more favorable for the movement sequence and the uniformity of the strand deposited onto the glass panel, however, if the outlet opening of the nozzle extends at right angles to the plane of the glass panel, and the movement direction of the nozzle is in the opposite direction. In this context the edge that necessarily exists between the outlet opening of the nozzle and the glass panel should be as narrow as possible so that the outlet opening can be brought as close as possible to the glass panel. While depositing the strand, the nozzle can slide on the glass panel with the end surface adjacent to the outlet opening. As soon as the nozzle has arrived back at the wedge-shaped beginning section of the strand that it has deposited, it is gradually lifted, the lifting being synchronized with the simultaneously occurring closing of the nozzle and being matched to the speed of the motion parallel to the glass panel plane so that a wedge-shaped end section of the strand is produced which has a shape complementary to the beginning section, so that the beginning section and end section have a thickness which is the same as or somewhat greater than the thickness of the strand outside the abutting point. To allow the nozzle to move unimpededly over the wedgeshaped beginning section of the strand, the end surface of the nozzle facing the glass panel plane is preferably oriented in similar fashion obliquely with respect to the glass panel plane, the angle of inclination with respect to the glass panel plane preferably being somewhat greater than is produced in the case of the oblique surface of the wedge-shaped beginning section of the strand. An oblique surface of this kind at the tip of the nozzle body is not, however, absolutely necessary; it would instead also be possible to initiate a rotary motion of the nozzle by means of which the outlet opening is gradually faced toward the glass panel plane, but such a solution would be more complex and less elegant.

The slide valve should preferably have a sharp leading edge so the emerging strand can be easily delimited and ultimately capped. If this leading edge has a slight concave curve and thus produces a slightly convexly curved surface on the strand, this is advantageous for effective pressing of the abutting point and sealing of the insulating glass pane when it is assembled.

DESCRIPTION OF THE DETAILED DRAWINGS

The appended schematic drawings provide additional explanation of the invention.

DETAILED DESCRIPTION OF THE PREFERRED EMBODIMENT

Figure 1:
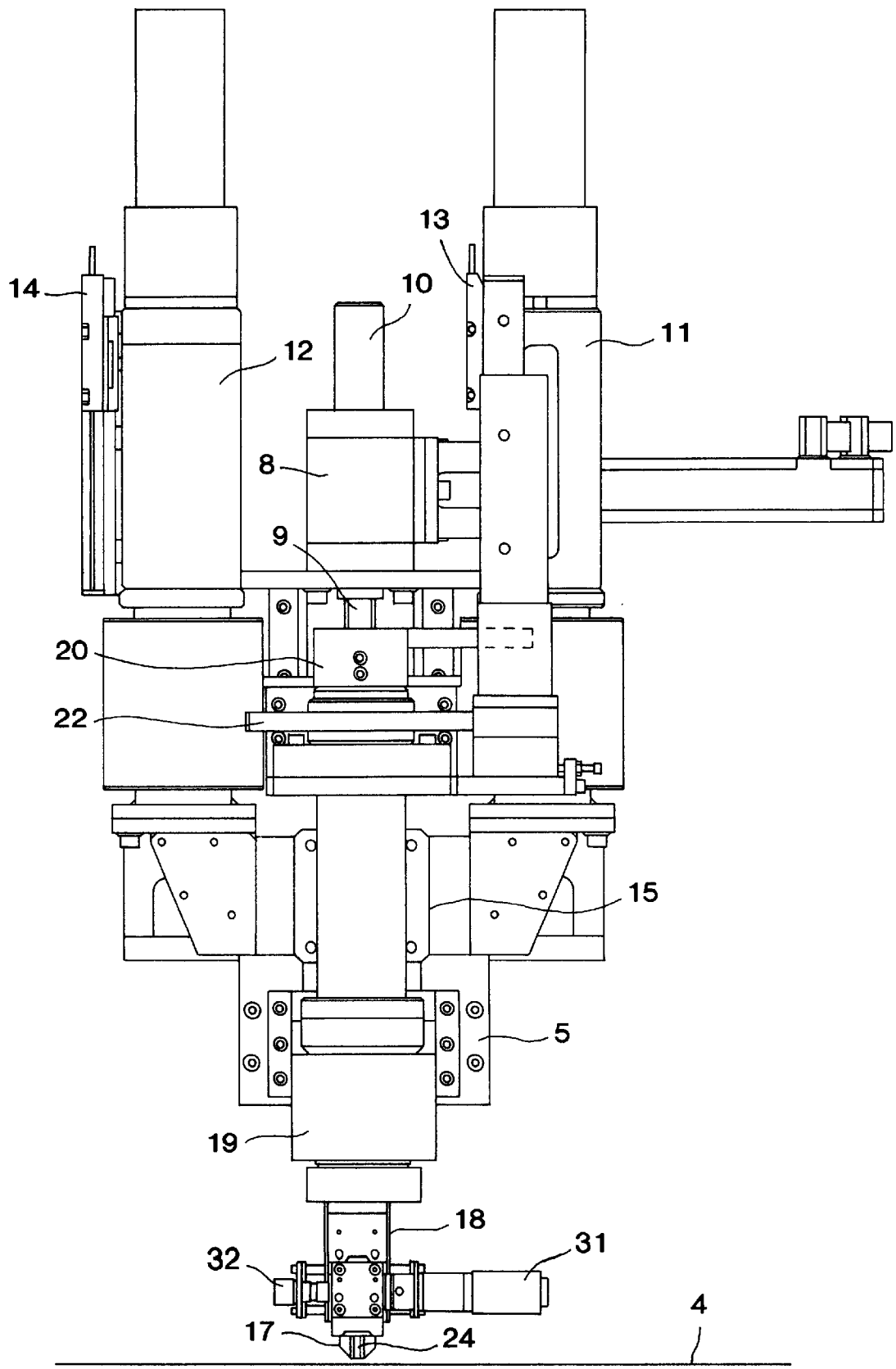
FIG. 1 shows an apparatus according to the invention in a front view.
Figure 2:
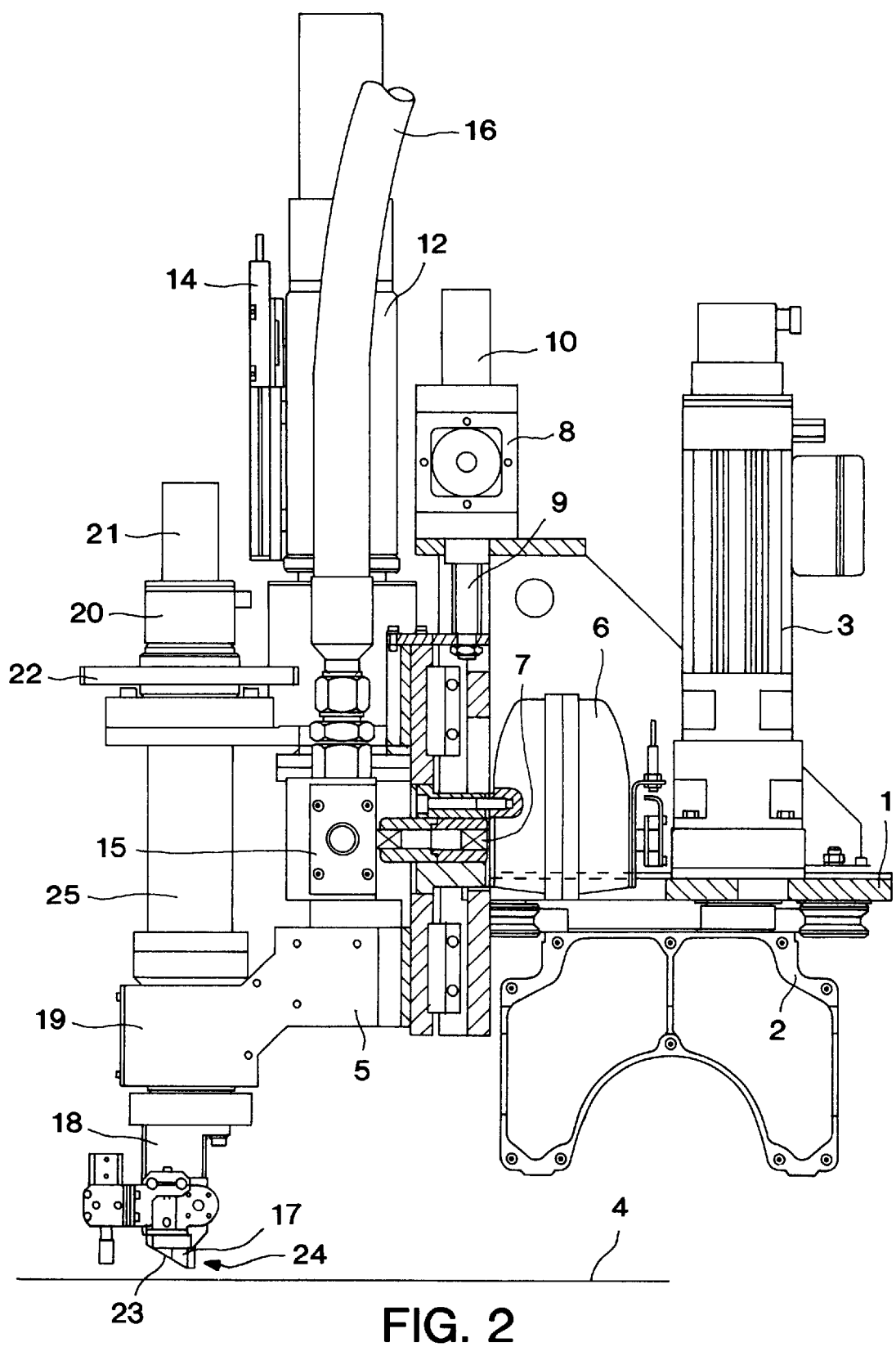
FIG. 2 shows the same apparatus in a partially sectioned side view.

Referring to FIGS. 1 and 2 apparatus of the invention has a carrier 1 which can be displaced along a crossmember 2 by a drive system 3, perpendicular to the drawing plane of FIG. 2. The crossmember itself is parallel to a plane 4 in which, during processing, the surface of a glass panel lies, displaceably at right angles to the longitudinal extension of crossmember 2. Also mounted on carrier 1 is a block 5 which can be pivoted by a rotation cylinder 6 about an axis 7 that is parallel to plane 4 and lies in the drawing plane of FIG. 2, and can be displaced perpendicular to plane 4 by a drive system consisting of an electric motor 8 and a spindle 9. In order to be able to perform this motion in controllable steps and at a controllable speed, motor 8 is connected to a rotor position and speed transducer 10.

Block 5 carries two alternatingly operated, refillable piston-cylinder units 11 and 12 to store and dispense the plastic compound from which spacers are to be formed. Piston-cylinder units 11 and 12 are each equipped with a level indicator 13, 14 with limit switches. The two piston-cylinder units 11 and 12 stand on a common valve block 15 into which a heated pressure hose 16, through which the plastic compound is supplied to the cylinder, opens.

Located in valve block 15 is a rotary slide valve which alternatingly connects the one piston-cylinder unit 11 or 12 to pressure hose 16, and the other piston-cylinder unit 12 or 11 to a nozzle 17. The nozzle is located at the tip of a hollow nozzle shaft 18 which is mounted rotatably in a mount 19 in which, via a rotary coupling known in the art, the plastic material forced out of one of piston-cylinder units 11, 12 passes into hollow nozzle shaft 18.

To rotate nozzle shaft 18 in its mount 19, a rotary drive system 20 with a slip ring transfer unit 21 and a rotor position and speed transducer 22 are attached to block 5.

Nozzle 17 has an end surface 23, running obliquely with respect to plane 4, which tapers to a point and immediately delimits an outlet opening 24 of the nozzle oriented perpendicular to plane 4. Outlet opening 24 has a substantially rectangular cross section. Rotation axis 25 of nozzle shaft 18 extends in the center of the outlet opening.

Figure 3:
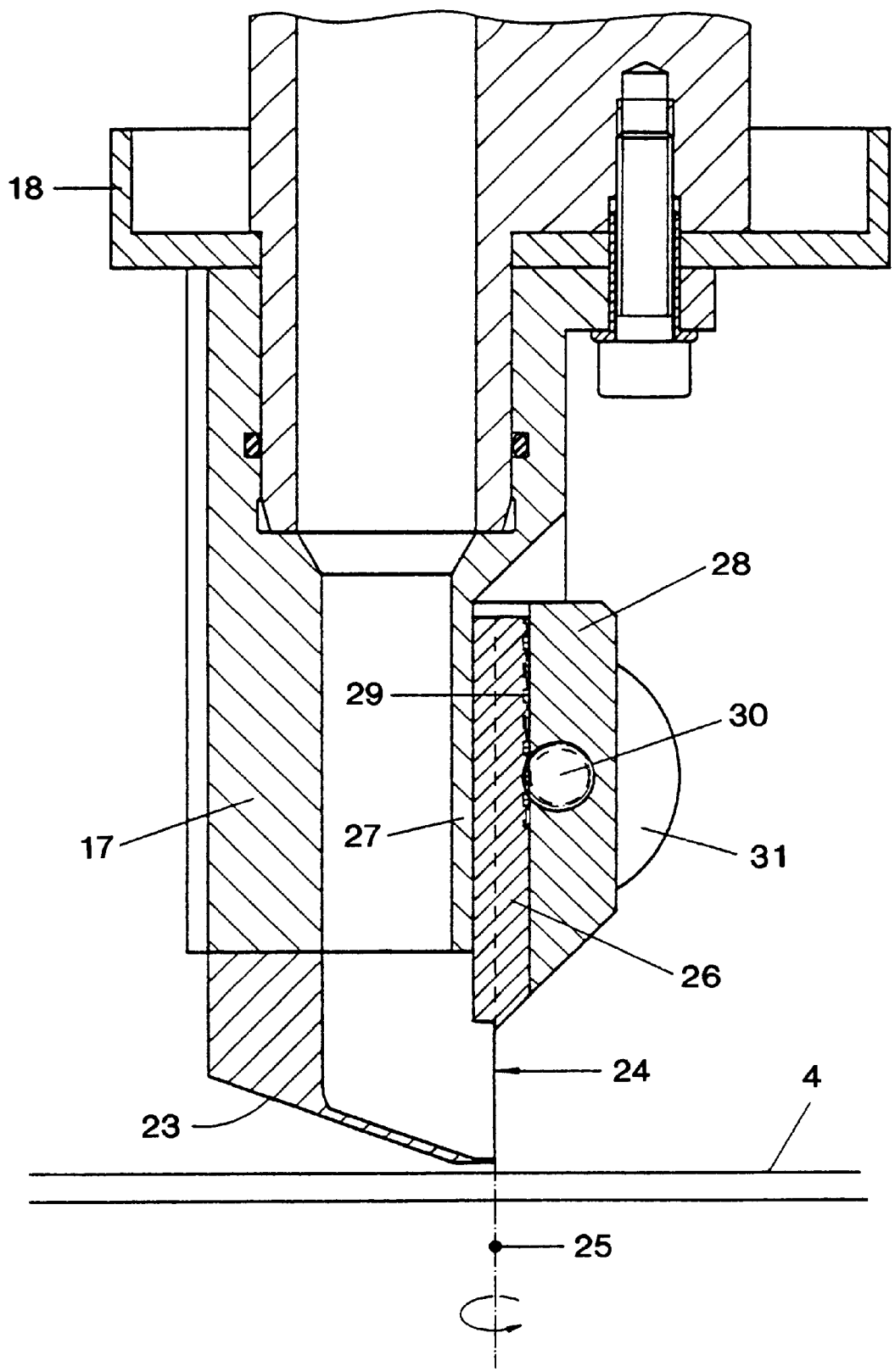
FIG. 3 shows a longitudinal section through the nozzle of the apparatus.

A slide valve 26, shown in FIG. 3, is arranged replaceably between a wall 27 of the nozzle shaft running parallel to axis 25 and a removable retainer 28, and is provided to close off outlet opening 24. Slide valve 26 is guided displaceably, parallel to axis 25, between wall 27 and retainer 28. In order to displace it, it is equipped with teeth 29 which mesh with a pinion 30 that can be driven controllably by a small electric motor installed on nozzle shaft 18. The slide valve position can be influenced by a potentiometer 32, shown in FIG. 1.

Electric motor 31 and motor 8 are electronically synchronized with one another.

Figure 5:
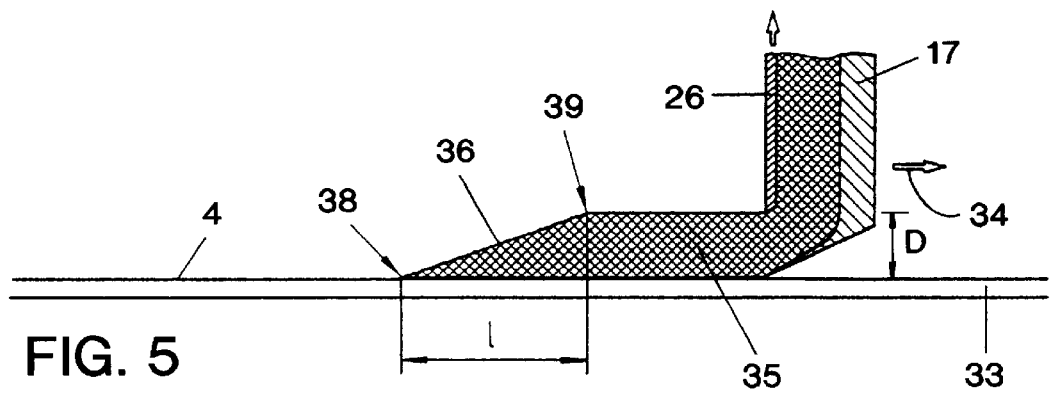
Figure 6:
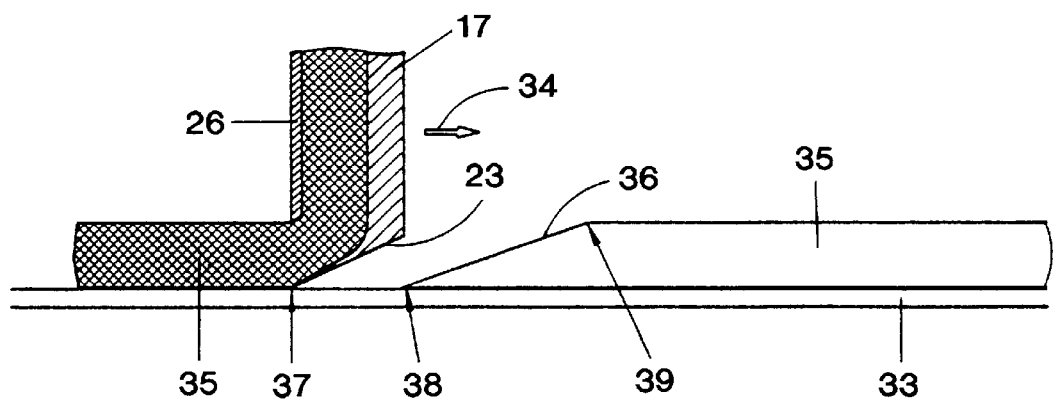
Figure 7:
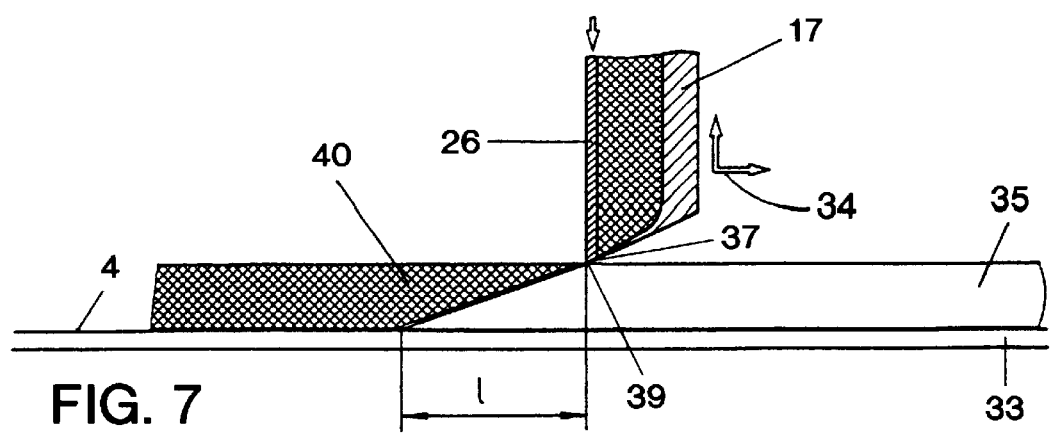

Reference is now made to FIGS. 5 to 7 in order to explain the operation of the apparatus.

Figure 4:
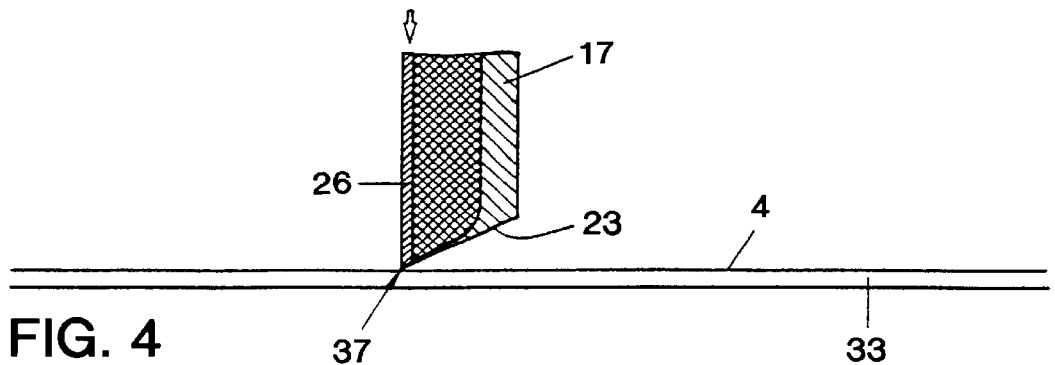
FIGS. 4 to 7 show the nozzle in four different phases of the production of a plastic spacer on a glass panel.

A glass panel 33, on whose upper side a plastic strand is to be applied as a spacer, lies with its upper side in plane 4, which is indicated in FIGS. 1 to 3. Nozzle 17 is lowered onto said upper side 4 (FIG. 4) by actuation of motor 8, slide valve 26 initially being in a closed position. The nozzle is then moved, by movement along crossmember 2 and/or by movement of crossmember 2 parallel to glass panel 33, in the direction of arrow 34 in a direction opposite to that of outlet opening 24. In the starting phase of the motion, slide valve is gradually opened over a segment of length L, until it reaches a predefined position (FIG. 5) in which strand 35 emerging from nozzle 17 has its intended thickness D. Because of the gradual opening of slide valve 26, strand 35 receives a gradually increasing thickness in the starting phase along length L, so that the upper side of the strand there is constituted by an oblique surface 36.

Nozzle 17 is then guided, parallel to glass panel 33 and along its rim, around glass panel 33, thereby depositing onto glass panel 33 a strand of consistent cross section and consistent thickness D. Nozzle 17 finally approaches its original position again (FIG. 6). It continues its movement unchanged until with its lower edge 37 it reaches tip 38 of the beginning section of strand 35. Because of the oblique profile of the lower end surface 23 of the nozzle, the angle of which is selected to be somewhat greater than the angle between oblique surface 36 and glass panel 33, planar contact does not occur between lower end surface 23 and oblique surface 36. As the movement of nozzle 17 in the direction of arrow 34 continues, the nozzle is now lifted up in controlled fashion, by actuation of motor 8, so that its lower edge 37 moves along oblique surface 36. Simultaneously and synchronously therewith, slide valve 26 is gradually advanced; it closes off the outlet opening when lower edge 37 of the nozzle has reached upper tip 39 of oblique surface 36 (FIG. 7). This forms a wedge-shaped end section 40 of the strand, which is configured in complementary fashion to the beginning section of the strand and rests on it. Preferably end section 40 is applied in the region of segment L with slight excess height as compared to intended thickness D of the strand, so as to obtain a particularly reliable bond in the region of the strand abutting point when the insulating glass pane is later pressed. This excess height can easily be achieved by not beginning the closing movement of slide valve 26 until lower edge 37 of the nozzle has already passed over a short length of tip 38 of the beginning section of strand 35.

I claim:

1. A method for applying a plastic material in strand form to create a spacer around a perimeter of a glass panel using an apparatus having thereon a movable nozzle defined by an end surface that defines a substantially rectangular nozzle outlet opening for dispensing said plastic material, said apparatus including a respective means for moving said nozzle parallel and perpendicular to said glass panel, said nozzle including a means for controlling a flow of plastic material from said nozzle, said strand having a first end, a second end, and a thickness equivalent to a predetermined distance from a surface of the glass panel, comprising the steps of:

positioning a glass panel adjacent said apparatus such that said nozzle is disposed in a starting position adjacent a perimeter edge of the glass panel;

simultaneously initiating movement of said nozzle along said perimeter with said nozzle outlet opening facing away from said moving direction and gradually opening said nozzle flow control means from a closed position to a fully opened position so as to discharge an amount of said plastic material from said nozzle outlet opening, thereby forming said first end of said strand, wherein when said nozzle moves and dispenses said plastic material, said nozzle remains close to said glass surface and forms said first end of said strand as a cross-sectionally shaped wedge having a constant width and a sloping height respective of a surface of a glass panel, which said sloping height defines an oblique surface having a first extent, said height sloping from a surface of said glass panel to a distance equivalent to said predetermined thickness;

continuing manipulation of said nozzle moving means so as to move said nozzle beyond said formed first end and to follow a remainder of the perimeter of said glass pane while simultaneously applying a continuous strand of said plastic material to said glass pane until said nozzle returns to said starting position and said first end of said strand, said continuous strand having a cross-sectional configuration having a constant height and width, wherein said constant height is equal to said predetermined height, and said constant width is equal to said width of said first end;

gradually closing said nozzle flow control means while continuing the movement along said perimeter of said panel so as to gradually decrease the amount of discharge of said plastic material from said nozzle outlet opening while simultaneously moving said nozzle away from said glass pane in a gradually increasing manner to thereby form a second end of said strand, wherein said second end of said strand rests coextensively upon said first end and is formed as a second cross-sectionally shaped wedge complementarily configured to that of said first end, said second wedge having a constant width and a sloping height, which said sloping height defines a second oblique surface respective said surface of said glass pane, said second oblique surface complementary to said oblique surface of said first end, each of said surfaces having a generally equal extent.

2. The method as defined in claim 1, wherein the strand is configured with a slight convexity on an outer, upper surface thereof.

3. The method as defined in claim 1, wherein at an abutting point between the first end and the second end of the strand, the thickness of the second end of the strand nominally exceeds the predetermined thickness of the strand.

4. An apparatus for applying a plastic spacer strand onto a glass panel to be used for assembling insulating glass panes, comprising:

a nozzle having an end that defines a substantially rectangular outlet opening and a slide valve for closing the outlet opening;

a first drive system for actuation of the slide valve;

a second drive system for moving the nozzle in a plane parallel to a glass panel to be operated upon; and a third drive system for moving the nozzle transverse to said plane the first drive system and the third drive system being synchronized with one another, wherein when said third drive system moves said nozzle away from a glass panel to be operated upon, the first drive system will close said slide valve.

5. The apparatus as defined in claim 4, wherein the outlet opening of the nozzle extends at a right angle to a glass panel to be operated upon, said outlet opening directed opposite to the movement direction of the nozzle in which it is movable by the second drive system.

6. The apparatus as defined in claim 5, wherein said nozzle has an end surface, which extends obliquely with respect to a panel to be operated upon.

7. The apparatus as defined in claim 4, wherein the slide valve has a lower edge formed with a slight concave curvature thereon.

8. The apparatus as defined in claim 5, wherein the slide valve has a lower edge formed with a slight concave curvature thereon.

9. The apparatus as defined in claim 6, wherein the slide valve has a lower edge formed with a slight curvature thereon.

* * * * *